(12) United States Patent
Hardy et al.

(10) Patent No.: US 10,324,662 B2
(45) Date of Patent: Jun. 18, 2019

(54) REBALANCING OF THE FIRST EXTENTS OF LOGICAL VOLUMES AMONG A PLURALITY OF RANKS

(71) Applicant: INTERNATIONAL BUSINESS MACHINES CORPORATION, Armonk, NY (US)

(72) Inventors: Clint A. Hardy, Tucson, AZ (US); Karl A. Nielsen, Tucson, AZ (US); Qiang Xie, Shanghai (CN); Hui Zhang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/687,993

(22) Filed: Aug. 28, 2017

(65) Prior Publication Data

US 2019/0065068 A1    Feb. 28, 2019

(51) Int. Cl.
*G06F 12/00* (2006.01)
*G06F 3/06* (2006.01)
*G06F 16/2457* (2019.01)

(52) U.S. Cl.
CPC .......... *G06F 3/067* (2013.01); *G06F 3/0665* (2013.01); *G06F 16/24578* (2019.01); *G06F 3/0689* (2013.01)

(58) Field of Classification Search
CPC . H04L 47/125; H04L 67/1008; G06F 3/0647; G06F 9/505; G06F 3/067
See application file for complete search history.

(56) References Cited

U.S. PATENT DOCUMENTS

| 7,404,036 B2* | 7/2008 | Hyde, II ............... G06F 3/0607 711/114 |
| 8,751,767 B2 | 6/2014 | Inoue et al. |
| 9,207,984 B2 | 12/2015 | Sivasubramanian et al. |
| 10,146,624 B1* | 12/2018 | Gong ................. G06F 11/1092 |
| 2004/0054656 A1 | 3/2004 | Leung et al. |
| 2007/0050544 A1 | 3/2007 | Chawla et al. |
| 2016/0004571 A1* | 1/2016 | Smith ............... G06F 17/30598 718/105 |
| 2017/0212690 A1 | 7/2017 | Babu et al. |

OTHER PUBLICATIONS

K. Blum, et al., "IBM DS8880 Architecture and Implementation (Release 8.2.1)", IBM Corporation, Document SG24-8323-02, Jan. 2017, pp. 470.

* cited by examiner

*Primary Examiner* — Arvind Talukdar
(74) *Attorney, Agent, or Firm* — Rabindranath Dutta Konrad Raynes Davda & Victor LLP

(57) ABSTRACT

A plurality of extents of a plurality of logical volumes are stored in a plurality of ranks, where each logical volume of the plurality of logical volumes is comprised of a plurality of extents including a first extent. In response to determining that first extents stored in each rank of the plurality of ranks have become unbalanced in number in the plurality of ranks, a balancing of the first extents in the plurality of ranks is performed by redistributing the first extents in the plurality of ranks.

24 Claims, 11 Drawing Sheets ered to as RAID ranks. The extents of a plurality of logical storage volumes are distributed in a plurality of RAID ranks and may be managed by a storage controller.
REBALANCING OF THE FIRST EXTENTS OF LOGICAL VOLUMES AMONG A PLURALITY OF RANKS

BACKGROUND

1. Field

Embodiments relate to rebalancing of the first extents of logical volumes among a plurality of ranks.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The physical storage space in the storage devices controlled by the storage controller may be present in a plurality of physical storage volumes. For example, a physical storage disk may be divided into a plurality of physical storage volumes. The hosts send requests for I/O operations with respect to logical storage volumes (also referred to as logical volumes) to the storage controller, and the storage controller may perform the mapping of the logical storage volumes to the physical storage volumes and execute the I/O operations. A logical storage volume may be comprised of a plurality of extents, where an extent is a unit of storage, such as a set of data blocks.

Redundant array of independent disks (RAID) is a data storage virtualization technology that combines a plurality of physical disk drive components into a single logical unit for the purposes of data redundancy, performance improvement, or both. A rank is a logically contiguous storage space, and ranks used in a RAID configuration are referred to as RAID ranks. The extents of a plurality of logical storage volumes are distributed in a plurality of RAID ranks and may be managed by a storage controller.

Further details of a storage controller may be found in the publication entitled "IBM DS8880 Architecture and Implementation (Release 8.2.1)", published January 2017 by the International Technical Support Organization of International Business Machines (IBM*) Corporation.

SUMMARY OF THE PREFERRED EMBODIMENTS

Provided are a method, system, and computer program product in which a plurality of extents of a plurality of logical volumes are stored in a plurality of ranks, where each logical volume of the plurality of logical volumes is comprised of a plurality of extents including a first extent. In response to determining that first extents stored in each rank of the plurality of ranks have become unbalanced in number in the plurality of ranks, a balancing of the first extents in the plurality of ranks is performed by redistributing the first extents in the plurality of ranks. Since I/O operations are more likely on the first extents than on other extents, by balancing the first extents in the plurality of ranks, the processing load for I/O operations is distributed across the plurality of ranks.

In further embodiments, on an average a greater number of I/O operations are performed on the first extent of a logical volume than on other extents of the logical volume. As a result, I/O operations are directed more evenly across the plurality of ranks when the first extents are balanced in the plurality of ranks.

In additional embodiments, the first extent of the logical volume stores a directory information of the logical volume. As a result, I/O operations with respect to the directory information are distributed more evenly across the plurality of ranks when the first extents are balanced in the plurality of ranks.

In certain embodiments, the redistributing further comprises moving a first extent of a first logical volume from a first rank to a second rank of the plurality or ranks, in response to determining that the second rank has a fewer number of first extents than the first rank. As a result, the first extents in each rank tend to equalize in number.

In further embodiments, in response to a request to add a new logical volume to the plurality of extents, a first extent of the new logical volume is placed in a rank of the plurality of ranks that has fewer first extents than other ranks of the plurality of ranks. As a result, new first extents are added to a rank that has the fewest first extents.

In yet further embodiments, the redistributing is performed in response to determining that an overhead for the redistributing does not exceed an expected increase in processing speed from the redistributing. As a result, the cost in terms of processing cycles for redistributing extents for the rebalancing of extents across ranks is considered prior to performing the redistributing of extents.

In additional embodiments, a logical volume is a logical representation of physical volumes stored in one or more storage devices, wherein a rank is a logically contiguous storage space, and wherein an extent is a unit of storage, and wherein the first extents stored in each rank of the plurality of ranks become unbalanced in number in the plurality of ranks, if a number of first extents differ by more than a predetermined percentage between any two ranks of the plurality of ranks.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In a storage controller, a logical volume may be comprised of a plurality of extents comprising a first extent and other extents. The extents of a plurality of logical volumes may be distributed across a plurality of ranks, where in certain embodiments a rank may be a RAID rank.

The first extent of a logical volume tends to have the most I/O operations as the directory information of data stored in the logical volume may be maintained in the first extent. Additionally, since writing of data may start from the first extent of a logical volume, the first extent has data written to it before other extents and the likelihood of I/O operations being performed on the first extent may be greater than the likelihood of I/O operations being performed on other extents. Having too many first extents reside in the same rank may impact the performance of the storage controller, because I/O operations may tend to cluster on the same rank.

Certain embodiments balance the first extents of a plurality of logical volumes across a plurality of ranks, such that each rank has substantially the same number of first extents. For example, in certain embodiments the first extents may be divided among ranks as equally as possible. As a result, in certain embodiments no rank maintained by a storage controller may be overloaded with I/O operations while other ranks are lightly loaded or not performing any I/O operations.

Exemplary Embodiments

Figure 1:
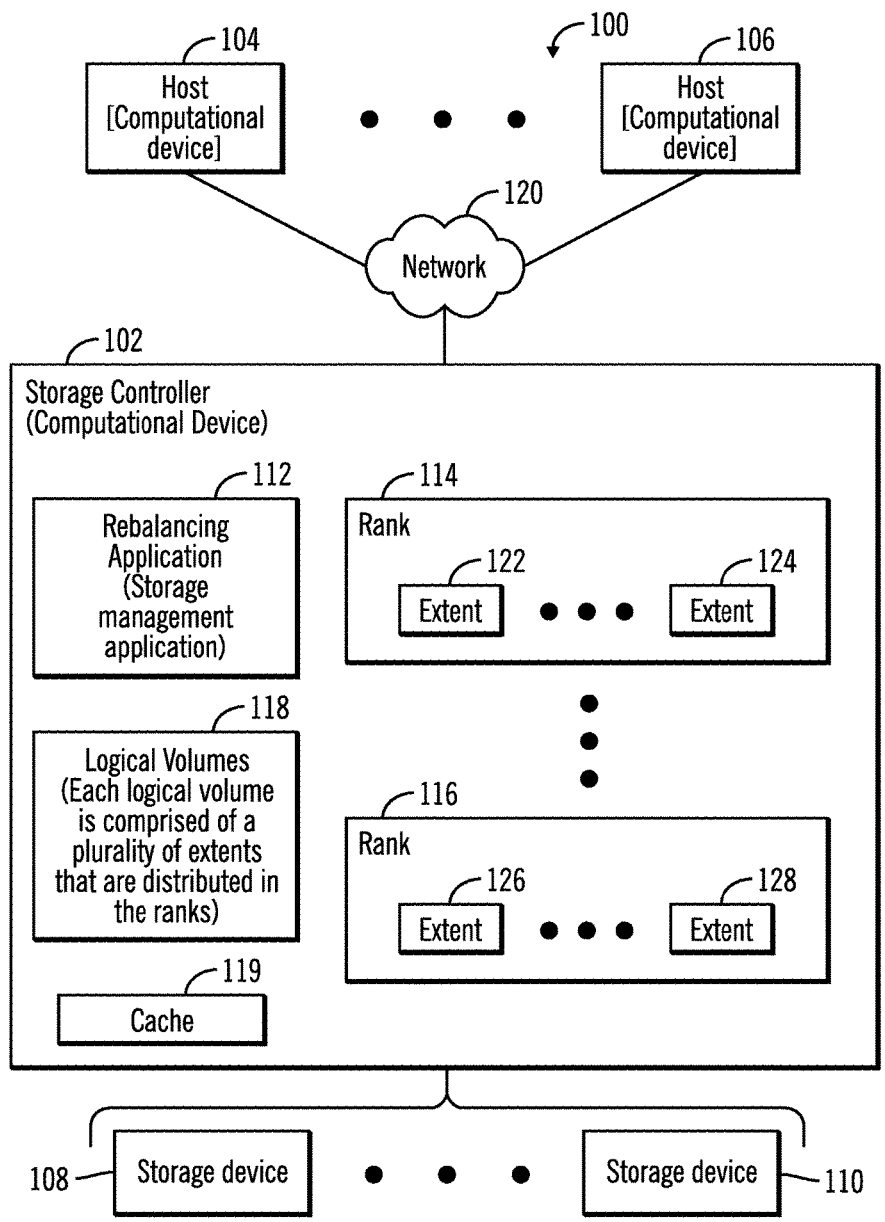
FIG. 1 illustrates a block diagram of a computing environment comprising a storage controller coupled to one or more hosts and one or more storage devices, where a rebalancing application performs a balancing of extents across a plurality of ranks, in accordance with certain embodiments.

FIG. 1 illustrates a block diagram of a computing environment 100 comprising a storage controller 102 coupled to one or more hosts 104, 106 and one or more storage devices 108, 110, where a rebalancing application 112 performs a balancing of extents across a plurality of ranks 114, 116, in accordance with certain embodiments. The rebalancing application 112 may be part of a storage management application that executes in the storage controller 102 and may control access to the storage devices 108, 110.

The storage controller 102 allows the plurality of hosts 104, 106 to perform input/output (I/O) operations with logical volumes 118 maintained by the storage controller 102. The physical volumes corresponding to the logical volumes 118 may be found in one or more of the storage devices 108, 110 and/or a cache 119 (e.g., a memory) of the storage controller 102.

The storage controller 102 and the hosts 104, 106 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102, the hosts 104, 106, and the storage devices 108, 110 may be elements in any suitable network 120, such as, a storage area network, a wide area network, the Internet, an intranet. In certain embodiments, the storage controller 102, the hosts 104, 106, and the storage devices 108, 110 may be elements in a cloud computing environment that comprises the computing environment 100. The storage devices 108, 110 may be comprised of storage disks, tape drives, solid state storage, etc., and may be controlled by the storage controller 102.

Each logical volume of the plurality of logical volumes 118 may be comprised of a plurality of extents. The plurality of extents of the plurality of logical volumes 118 may be distributed in the plurality of ranks 114, 116 maintained in the storage controller 102. For example, the plurality of extents 122, 124, 126, 128 are shown as being distributed among the plurality of ranks 114, 116. The ranks may be RAID ranks managed by the storage controller 102 to provide redundancy and access to the storages devices 108, 110.

In certain embodiments, the rebalancing application 112 that may be implemented in software, firmware, hardware or any combination thereof may distribute the first extents of the logical volumes 118 as evenly as possible among the plurality of ranks 114, 116 to increase the likelihood of even distribution of I/O operations among the ranks 114, 116.

Figure 2:
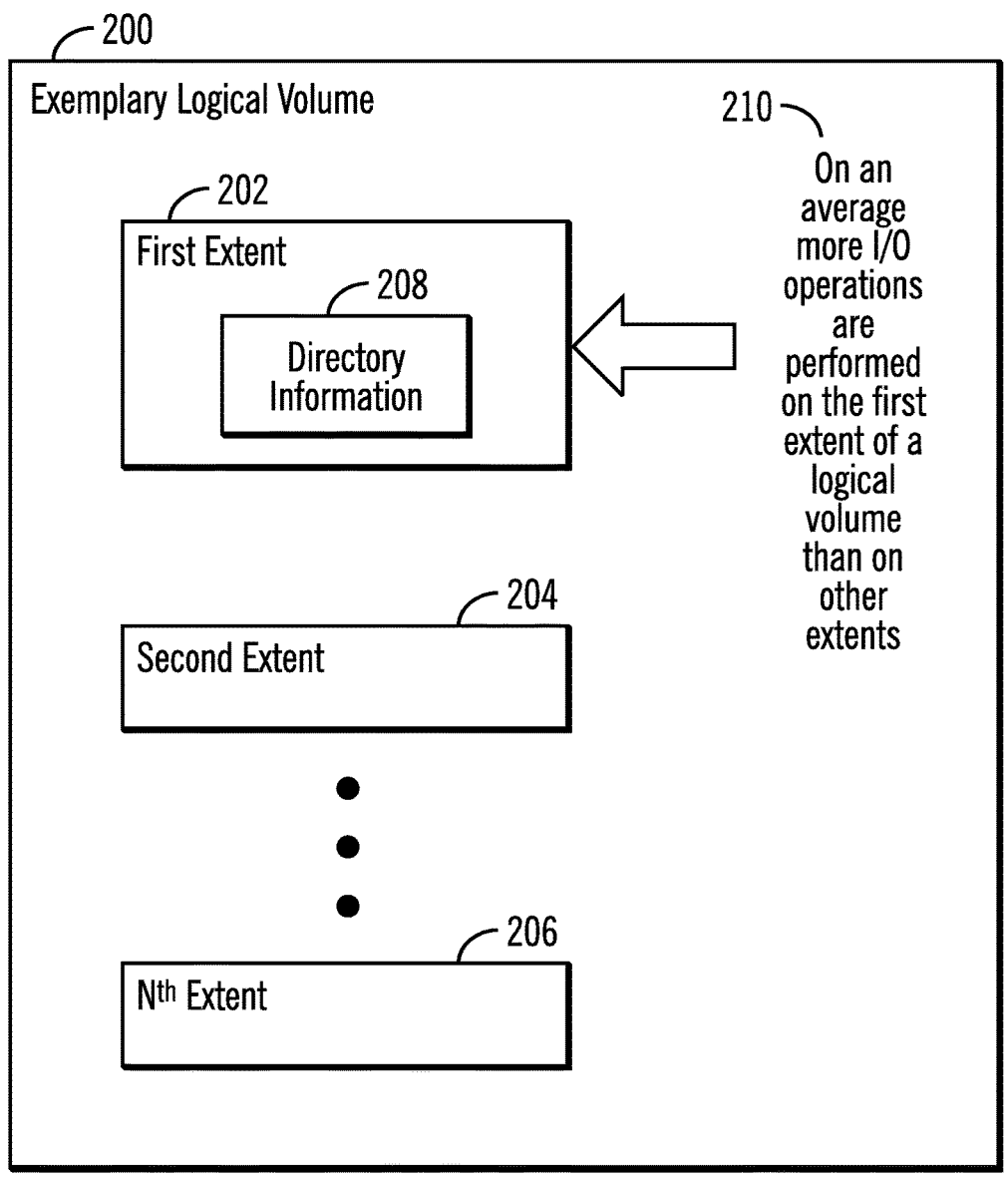
FIG. 2 illustrates a block diagram that shows an exemplary logical volume, in accordance with certain embodiments.

FIG. 2 illustrates a block diagram that shows an exemplary logical volume 200, in accordance with certain embodiments. The exemplary logical volume 200 may be any logical volume of the logical volumes 118 shown in FIG. 1.

The exemplary logical volume may be comprised of a plurality of extents 202, 204, 206, where extent 202 is the first extent in which directory information 208 of data stored in the logical volume 200 is stored. To access data stored in the extents 202, 204, 206 of the logical volume 200, an I/O operation may first be performed to the directory information 208 to locate the data in the logical volume 200. As a result, on an average more I/O operations are performed on the first extent 202 of the logical volume 200 than on the other extents 204, 206 of the logical volume 200 (as shown via reference numeral 210).

Figure 3:
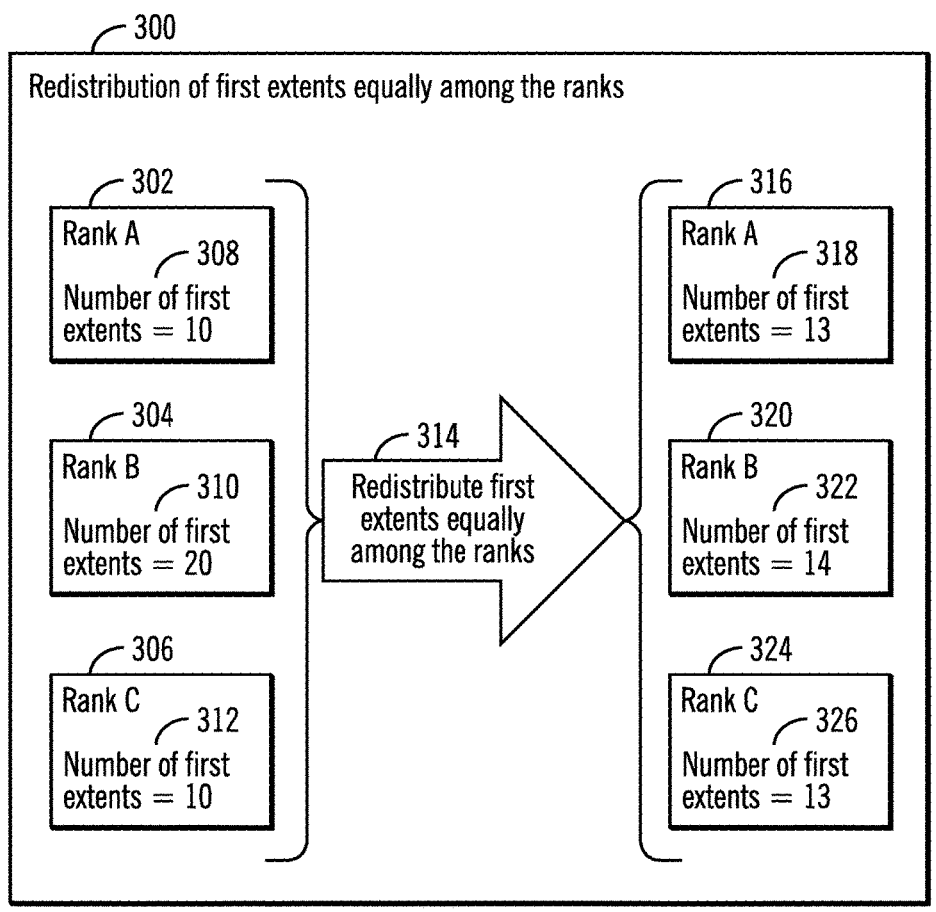
FIG. 3 illustrates a block diagram that shows a redistribution of extents equally among the ranks, in accordance with certain embodiments.

FIG. 3 illustrates a block diagram 300 that shows a redistribution of extents equally among the ranks maintained by a storage controller 102, in accordance with certain embodiments. The redistribution of extents may be performed by the rebalancing application 112 that executes in the storage controller 102.

A set of three ranks denoted as rank A 302, rank B 304, and rank C 306 are shown, where the number of first extents in rank A 302 is 10 (shown via reference numeral 308), the number of first extents in rank B 304 is 20 (shown via reference numeral 310) and the number of first extents in rank C 306 is 10 (shown via reference numeral 312). In such a situation, rank B 304 which has double the number of extents in comparison to rank A 302 or rank C 306 may be overloaded by I/O operations in comparison to rank A 302 or rank C 306.

In certain embodiments, the rebalancing application 112 determines the total number of first extents in the ranks 302, 304, 306. In the embodiments shown in FIG. 3, the total number of first extents in the ranks 302, 304, 306 is 40 as determined by adding the number of first extents in each of the three ranks 302, 304, 306.

The rebalancing application 112 redistributes (as shown via reference numeral 314) the 40 first extents among the three ranks by dividing the 40 first extents as equally as possible among the three ranks. For example in certain embodiment, the number of first extents in rank A is increased to 13 (as shown via reference numerals 316, 318), the number of first extents in rank B is decreased to 14 (as shown via reference numerals 320, 322), and the number of first extents in rank C is increased to 13 (as shown via reference numerals 324, 326). As a result, the first extents are evenly distributed to the degree possible and no rank is likely to be excessively overloaded with I/O operations in comparison to other ranks.

Figure 4:
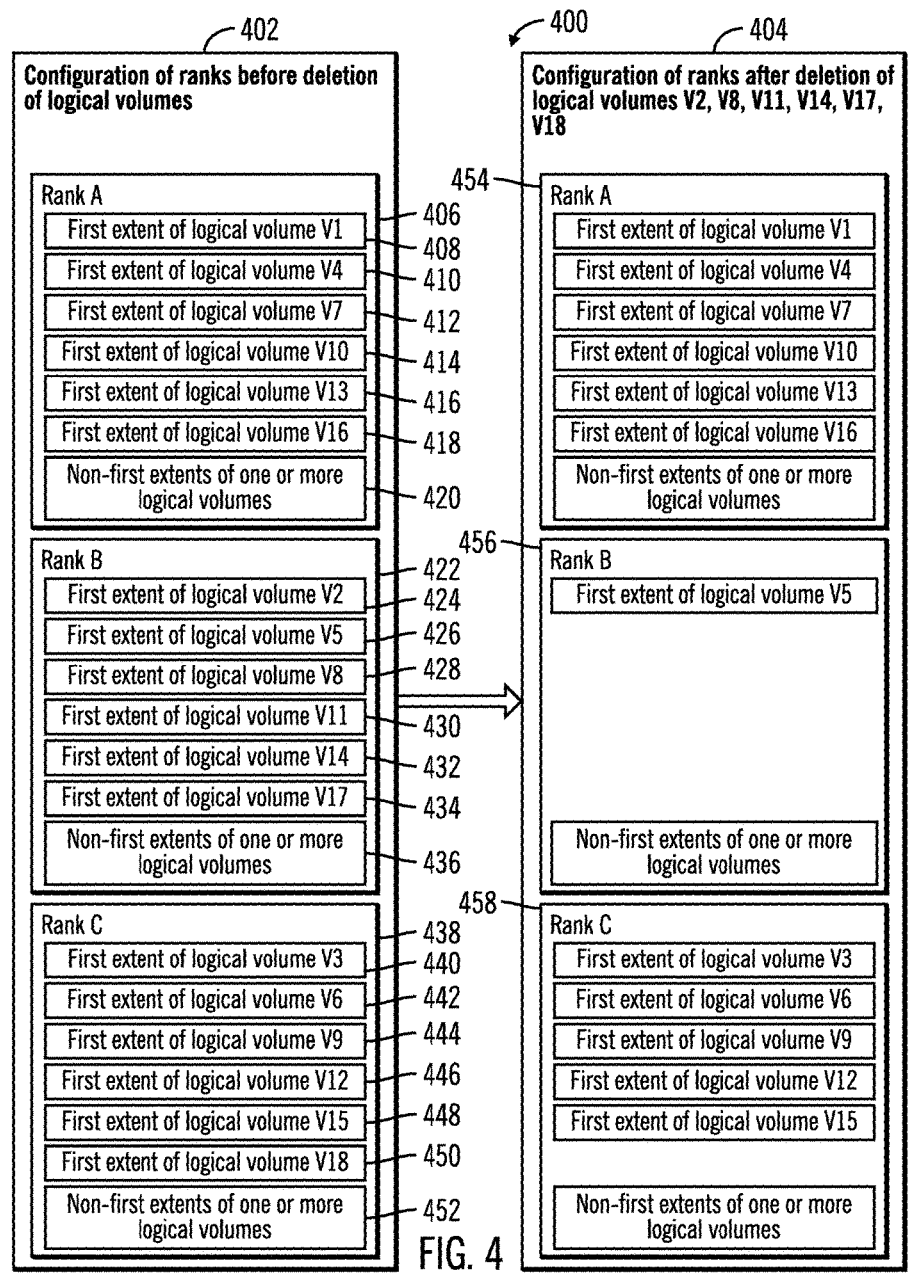
FIG. 4 illustrates a block diagram that shows a configuration of ranks before and after deletion of logical volumes, in accordance with certain embodiments.

FIG. 4 illustrates a block diagram 400 that shows a configuration of ranks before (as shown via reference numeral 402) and after (as shown via reference numeral 404) deletion of logical volumes, in accordance with certain embodiments.

In FIG. 4, before deletion of logical volumes (reference numeral 402) rank A 406 is shown to have the first extents of logical volumes V1, V4, V7, V10, V13, V16 (shown via reference numerals 408, 410, 412, 414, 416, 418) and non-first extents (i.e., extents that are not first extents) of one or more logical volumes (shown via reference numeral 420). Rank B 422 is shown to have the first extents of logical volumes V2, V5, V8, V11, V14, V17 (shown via reference numerals 424, 426, 428, 430, 432, 434) and non-first extents of one or more logical volumes (shown via reference numeral 436). Rank C 438 is shown to have the first extents of logical volumes V3, V6, V9, V12, V15, V18 (shown via reference numerals 440, 442, 444, 446, 448, 450) and non-first extents of one or more logical volumes (shown via reference numeral 452).

One or more processes that executes in the storage controller 102 may delete logical volumes V2, V8, V11, V14, V17, and V18, and the configuration of the ranks A, B, C after the deletion of logical volumes V2, V8, V11, V14, V17, and V18 are shown via reference numerals 404, 454, 456, 458. It may be seen that rank B has only 2 first extents after deletion of logical volume in comparison to 6 first extents before deletion of logical volumes (reference numerals 456, 422), and rank C has 5 first extents after deletion of logical volumes in comparison to 6 first extents before deletion of logical volumes (reference numerals 458, 438), whereas the number of first extents have remain unchanged from 6 in rank A (reference numerals 454, 406).

After the deletion of extents shown in FIG. 4, ranks A and C may be overloaded with I/O operations in comparison to rank B.

Figure 5:
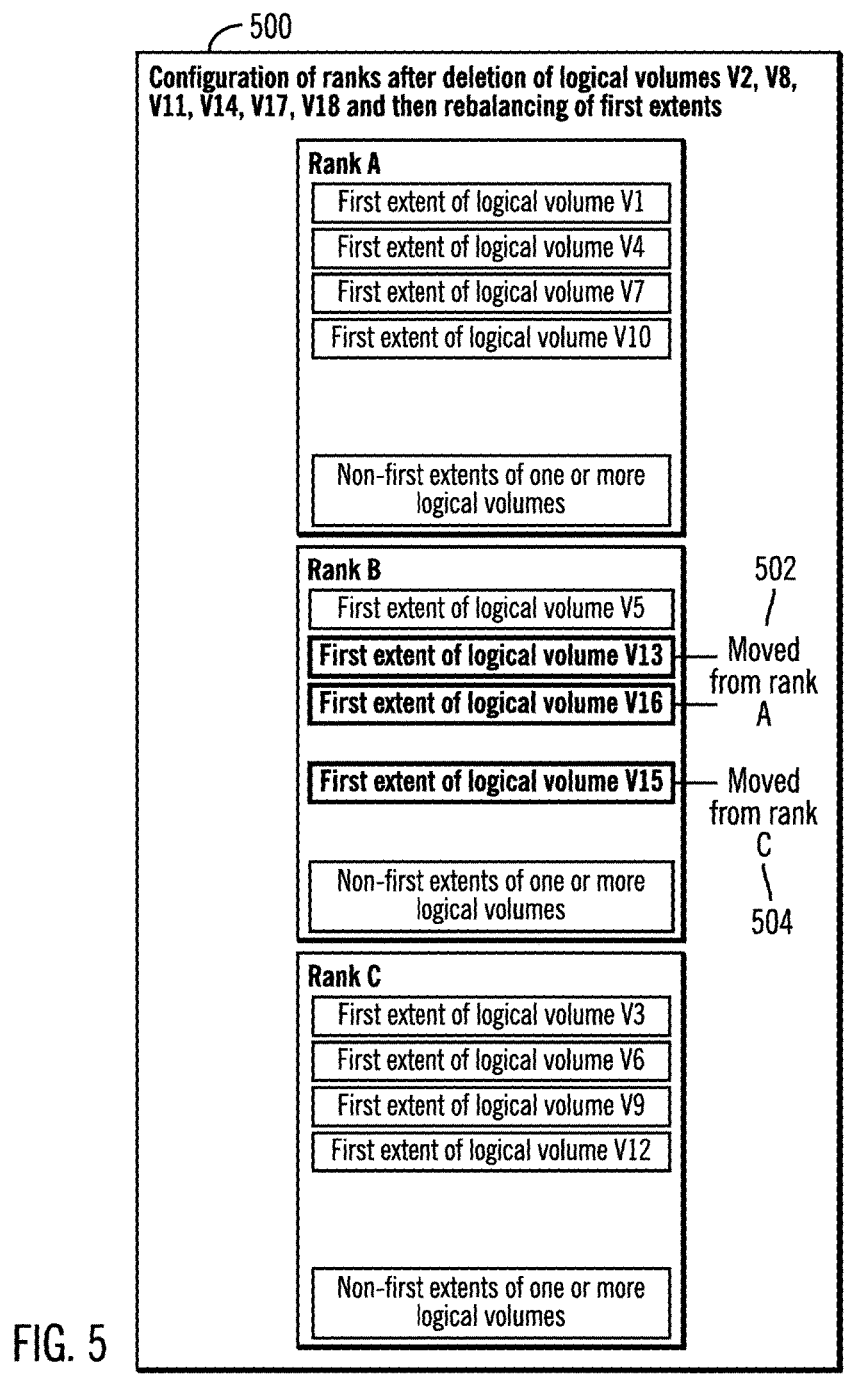
FIG. 5 illustrates a block diagram that shows a configuration of ranks after deletion of logical volumes and then after rebalancing of first extents among the ranks, in accordance with certain embodiments.

FIG. 5 illustrates a block diagram 500 that shows a configuration of ranks after the deletion of logical volumes (shown in FIG. 4) and then after rebalancing of first extents among the ranks, in accordance with certain embodiments. Logical volumes V13, V16 are moved from rank A to rank B (as shown via reference numeral 502) and volume V15 is moved from rank C to rank B (as shown via reference numeral 504). As a result, each of the ranks A, B, C now have 4 first extents after the rebalancing of first extents among the ranks A, B, C. As a result, I/O operations may be more evenly distributed among the ranks A, B, C.

Figure 6:
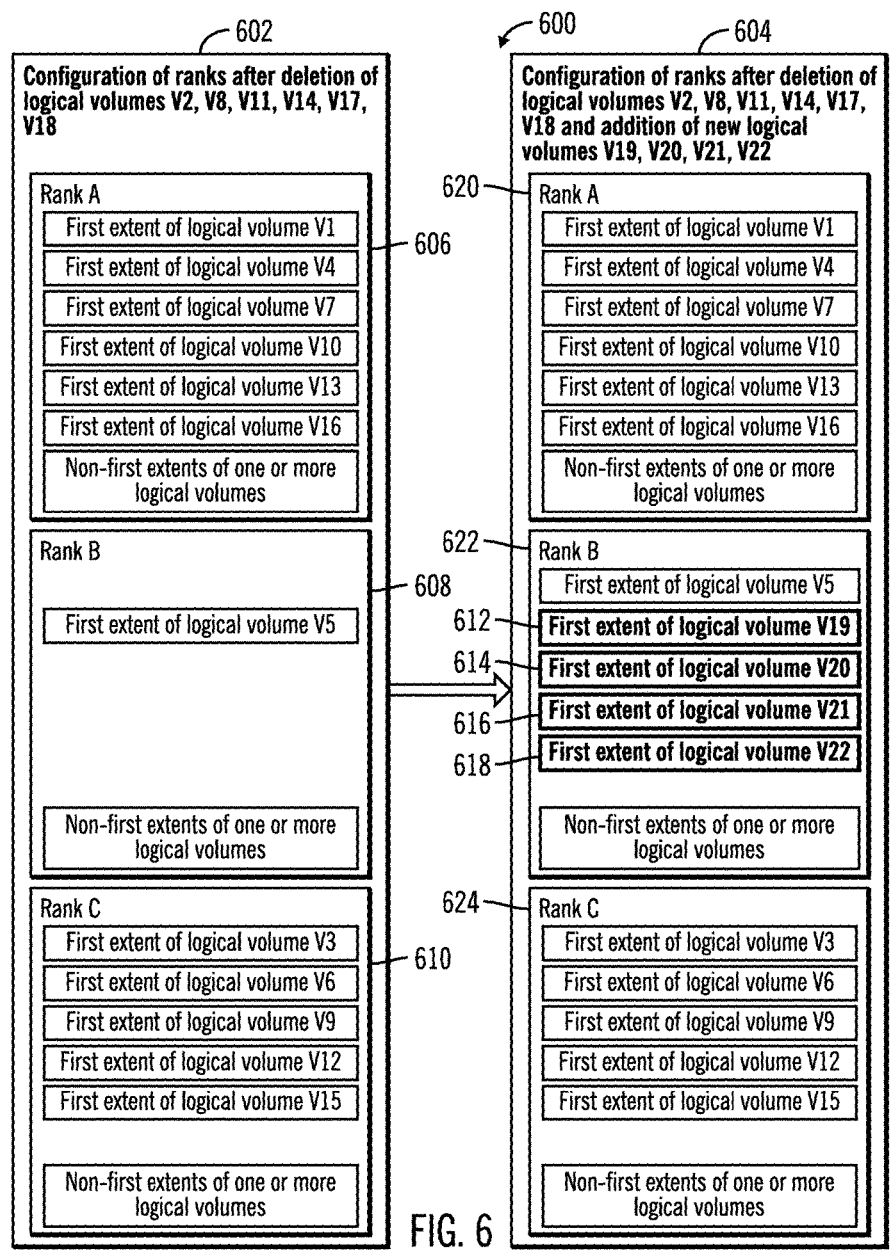
FIG. 6 illustrates a block diagram that shows a configuration of ranks after deletion of logical volumes and then after addition of new logical volumes, in accordance with certain embodiments.

FIG. 6 illustrates a block diagram 600 that shows a configuration of ranks after deletion of logical volumes (as shown by reference numeral 602) as shown in FIG. 4, and then after addition of new logical volumes (as shown by reference numeral 604), in accordance with certain embodiments.

After the deletion of logical volumes V2, V8, V11, V14, V17, V18 (as shown in FIG. 4 by reference numeral 404, and in FIG. 6 by reference numeral 602), new logical volumes V19, V20, V21, V22 are added to ranks A, B, C. Since rank B has only 2 first extents, while ranks A and C have 6 and 5 first extents respectively (as shown via reference numeral 602, 606, 608, 610), the first extents of the new logical volumes V19, V20, V21, V22 are added to rank B (as shown via reference numeral 612, 614, 616, 618). As a result, on addition of new logical volumes the first extents are distributed as evenly as possible among the ranks A, B, C (as shown via reference numerals 604, 620, 622, 624).

Figure 7:
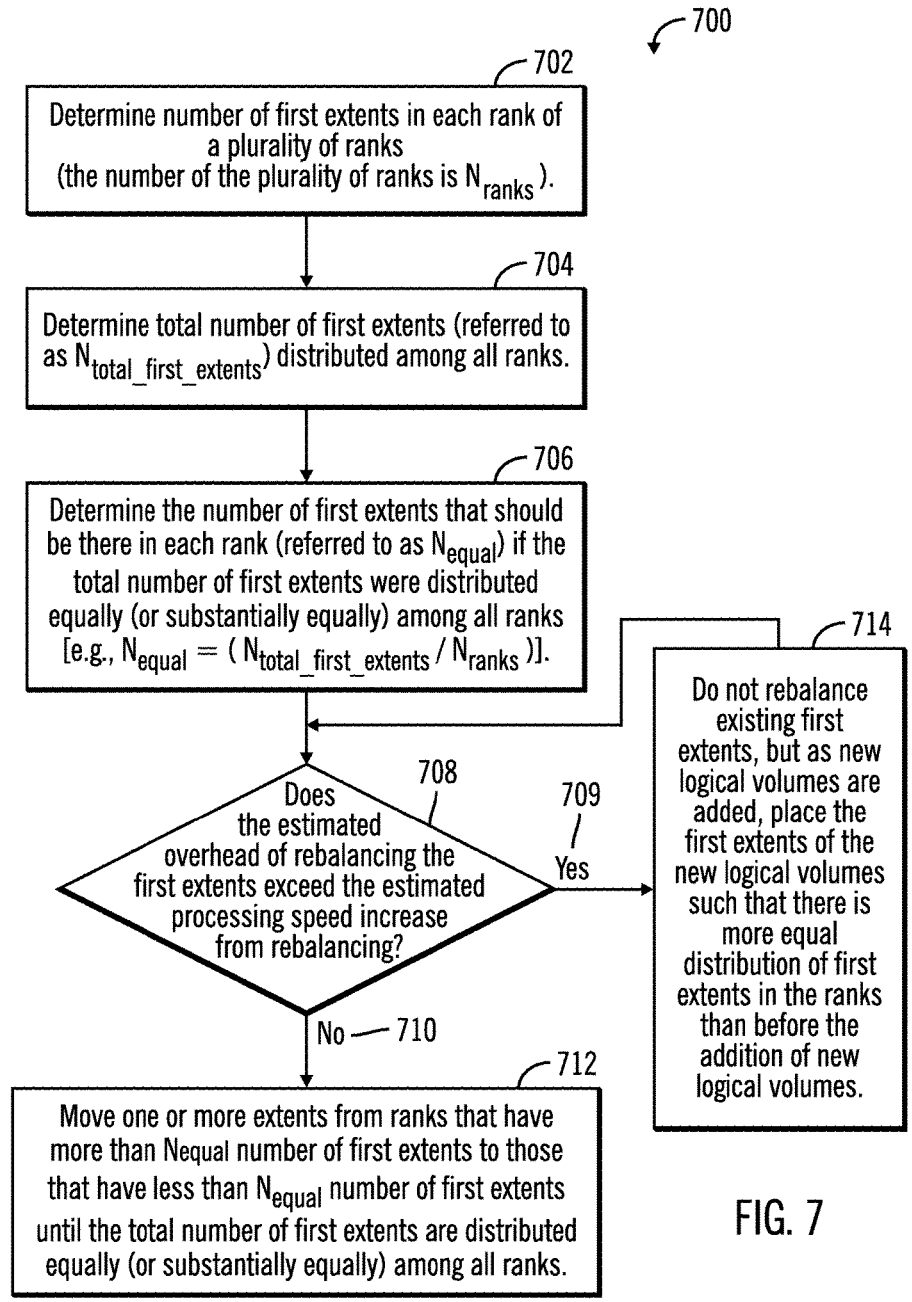
FIG. 7 illustrates a first flowchart that shows the rebalancing of first extents among a plurality of ranks, in accordance with certain embodiments.

FIG. 7 illustrates a first flowchart 700 that shows the rebalancing of first extents among a plurality of ranks, in accordance with certain embodiments. The operations shown in FIG. 7 may be performed by the rebalancing application 112 that executes in the storage controller 102.

Control starts at block 702 in which the rebalancing application 112 determines the number of first extents in each rank of a plurality of ranks. The number of the plurality of ranks is may be referred $N_{ranks}$. The rebalancing application 112 then determines (at block 704) the total number of first extents (referred to as $N_{total\_first\_extents}$) distributed among all ranks. For example, if ranks A, B, C have 7, 8, and 5 extents respectively, the $N_{total\_first\_extents}$ is 20.

Control proceeds to block 706, in which the rebalancing application 112 determines the number of first extents that should be there in each rank (referred to as $N_{equal}$) if the total number of first extents were distributed equally (or substantially equally) among all ranks. In certain embodiment, $N_{equal}$ may be computed to be $N_{total\_first\_extents}$ divided by $N_{ranks}$.

The rebalancing application determines (at block 708) whether the overhead of rebalancing the first extents exceed the estimated processing speed increase from the rebalancing. For example, if it takes an estimated time of 3 ms. to rebalance the extents, but the estimated time of processing of a predetermined number of I/O operations is improved by 1 ms. then the overhead of rebalancing may be too much and rebalancing of extents may not be performed. The estimated times for processing may be determined from simulations or via performance analysis of prior rebalancing operations. If the estimated overhead of rebalancing the first extents does not exceed the estimated processing speed increase from the rebalancing ("No" branch 710) then control proceeds to block 712 in which the rebalancing application 112 moves one or more extents from ranks that have more than $N_{equal}$ number of first extents to those that have less than $N_{equal}$ number of extents until the total number of first extents are distributed equally (or substantially equally) among all ranks.

If the estimated overhead of rebalancing the first extents exceeds the estimated processing speed increase from the rebalancing ("Yes" branch 709) then control proceeds to block 714 in which the rebalancing application 112 does not rebalance the existing first extents, but as new logical volumes are added, the rebalancing application 112 places the first extent of the new logical volumes such that there is more equal distribution of first extents in the ranks than before the addition of new logical volumes, and control returns to block 708.

Figure 8:
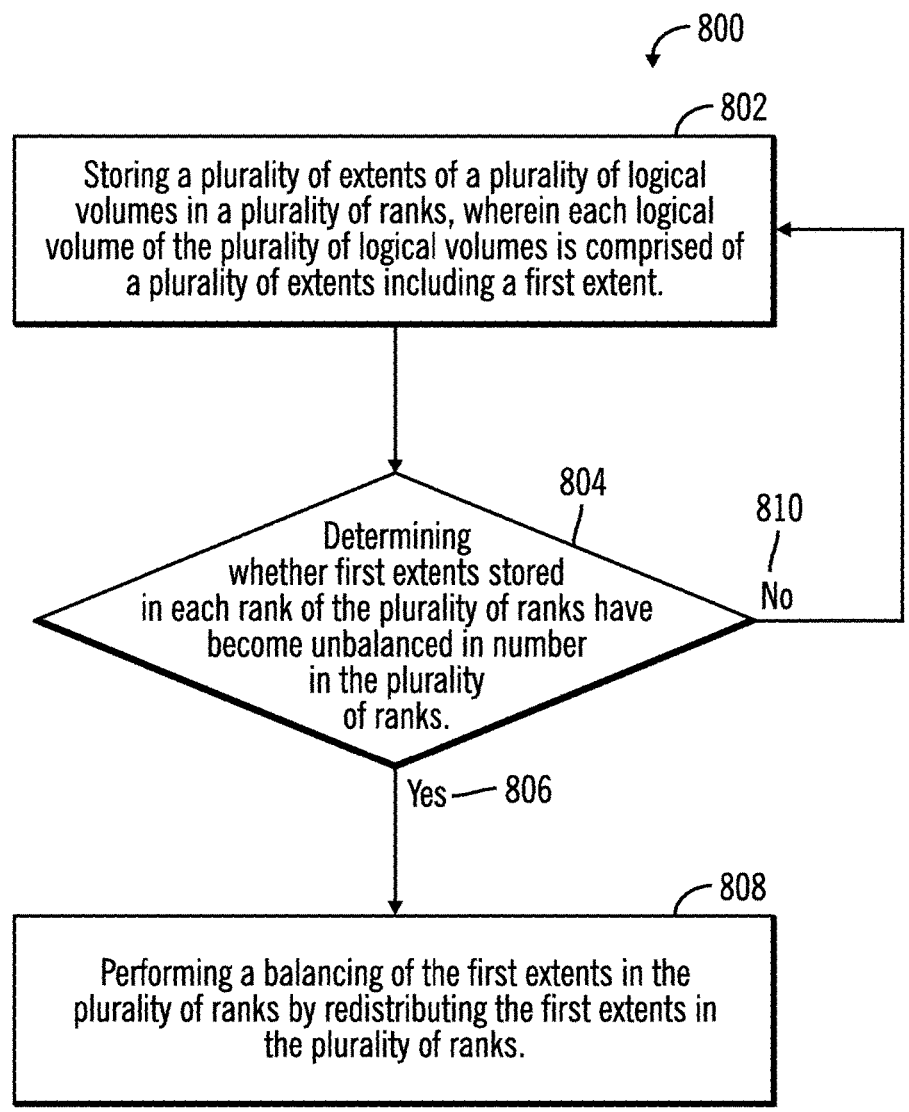
FIG. 8 illustrates a second flowchart that shows the rebalancing of first extents among a plurality of ranks, in accordance with certain embodiments.

FIG. 8 illustrates a second flowchart that shows the rebalancing of first extents among a plurality of ranks, in accordance with certain embodiments. The operations shown in FIG. 8 may be performed by the rebalancing application 112 that executes in the storage controller 102.

Control starts at block 802 in which a plurality of extents of a plurality of logical volumes 118 are stored in a plurality of ranks 114, 116 where each logical volume of the plurality of logical volumes is comprised of a plurality of extents including a first extent 202.

Control proceeds to block 804 in which the rebalancing application 112 determines whether the first extents stored in each rank of the plurality of ranks have become unbalanced in number in the plurality of ranks. For example, the first extents may have become unbalanced if the first extents stored in any two different ranks differ in number by more than 20% (e.g., rank A has 100 first extents but rank B has 70 first extents, so the extents have become unbalanced). In certain embodiments, the first extents stored in each rank of the plurality of ranks become unbalanced in number in the plurality of ranks 114, 116, if a number of first extents differ by more than a predetermined percentage between any two ranks of the plurality of ranks 114, 116.

In response to determining that the first extents stored in each rank of the plurality of ranks have become unbalanced in number ("Yes" branch 806), the rebalancing application 112 performs a balancing (block 808) of the first extents in the plurality of ranks by redistributing the first extents in the plurality of ranks, in accordance with embodiments shown in FIGS. 1-7 or via other variations of the embodiments shown in FIGS. 1-7.

In response to determining that the first extents stored in each rank of the plurality of ranks have not become unbalanced in number ("No" branch 810) control returns to block 802 in which additional first extents of new logical volumes may be stored in the plurality of ranks, before another determination is made (at block 804) as to whether the extents have become unbalanced in the ranks.

Therefore, FIGS. 1-8 illustrate certain embodiments in which first extents of a plurality of logical volumes are balanced (e.g., distributed as evenly as possible) across a plurality of ranks in an attempt to avoid overload of I/O operations on any of the ranks.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
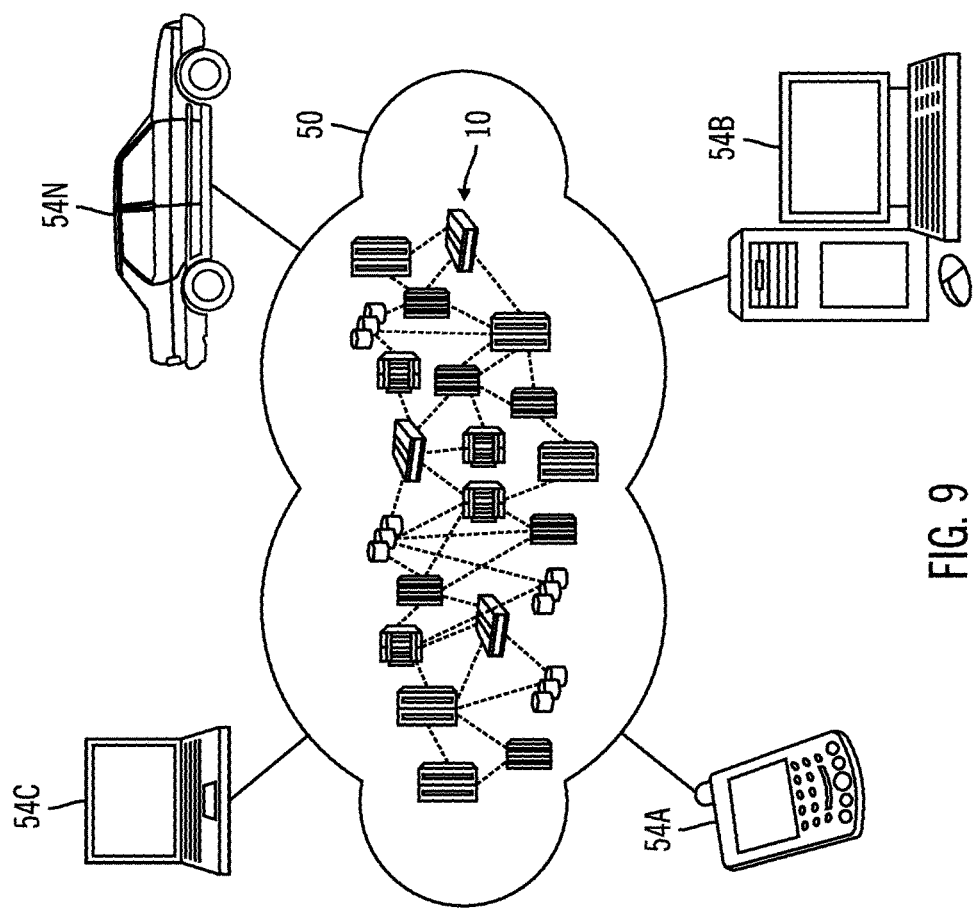
FIG. 9 illustrates a block diagram of a cloud computing environment, in accordance with certain embodiments.

Referring now to FIG. 9 a cloud computing environment 50 of certain embodiments is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that cloud computing nodes 10 and cloud computing environment 50 can communicate with any type of computerized device over any type of network and/or network addressable connection (e.g., using a web browser).

Figure 10:
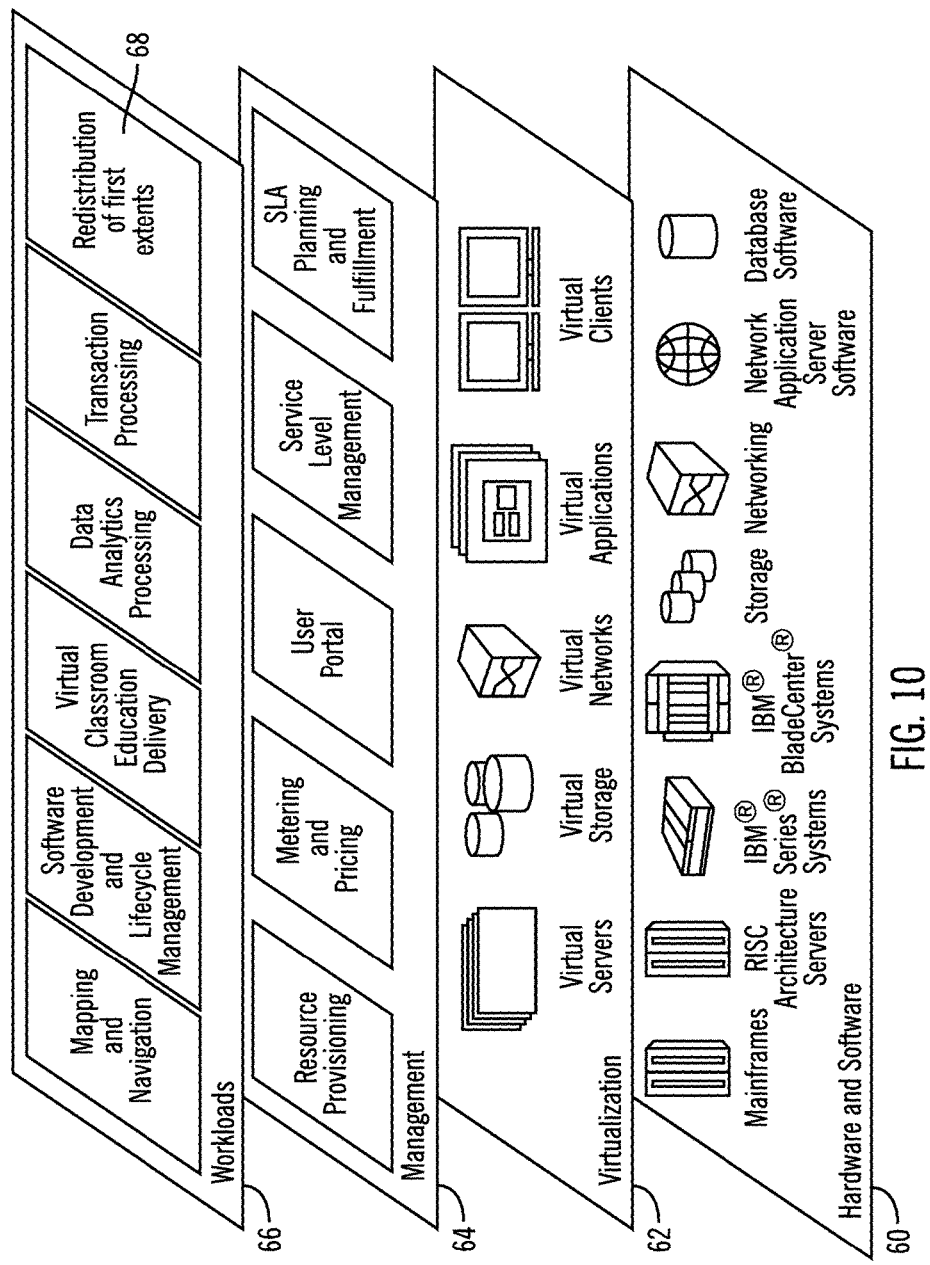
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and redistribution of first extents 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
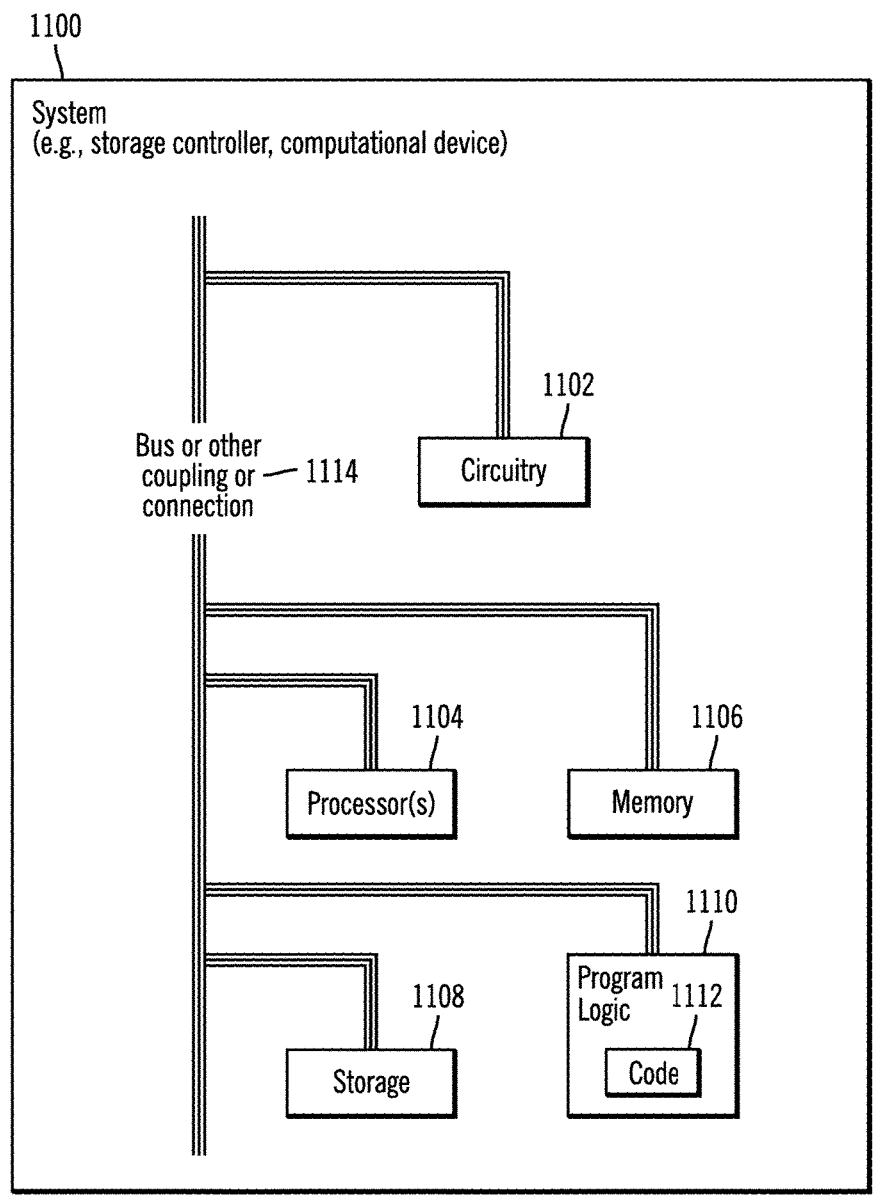
FIG. 11 illustrates a block diagram of a computational system that shows certain elements that may be included in the storage controller or the host, as described in FIGS. 1-10, in accordance with certain embodiments.

FIG. 11 illustrates a block diagram that shows certain elements that may be included in the storage controller 102 or the hosts 104, 106, or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   storing a plurality of extents of a plurality of logical volumes in a plurality of ranks, wherein each logical volume of the plurality of logical volumes is comprised of a plurality of extents including a first extent;
   determining that first extents stored in each rank of the plurality of ranks have become unbalanced in number in the plurality of ranks by determining that a number of first extents differs by more than a predetermined percentage between any two ranks of the plurality of ranks; and
   in response to determining that first extents stored in each rank of the plurality of ranks have become unbalanced in number in the plurality of ranks, performing a balancing of the first extents in the plurality of ranks by redistributing the first extents in the plurality of ranks, wherein the redistributing is performed in response to determining that an overhead for the redistributing does not exceed an expected increase in processing speed from the redistributing, and wherein the first extent of a logical volume stores a directory information of the logical volume.

2. The method of claim 1, wherein the redistributing further comprises:
   moving a first extent of a first logical volume from a first rank to a second rank of the plurality or ranks, in response to determining that the second rank has a fewer number of first extents than the first rank.

3. The method of claim 1, the method further comprising:
   in response to a request to add a new logical volume to the plurality of extents, placing a first extent of the new logical volume in a rank of the plurality of ranks that has fewer first extents than other ranks of the plurality of ranks.

4. The method of claim 1, wherein a logical volume is a logical representation of physical volumes stored in one or more storage devices, wherein a rank is a logically contiguous storage space, and wherein an extent is a unit of storage.

5. A system, comprising:
a memory; and
a processor coupled to the memory, wherein the processor performs operations, the operations comprising:
storing a plurality of extents of a plurality of logical volumes in a plurality of ranks, wherein each logical volume of the plurality of logical volumes is comprised of a plurality of extents including a first extent;
determining that first extents stored in each rank of the plurality of ranks have become unbalanced in number in the plurality of ranks by determining that a number of first extents differs by more than a predetermined percentage between any two ranks of the plurality of ranks; and
in response to determining that first extents stored in each rank of the plurality of ranks have become unbalanced in number in the plurality of ranks, performing a balancing of the first extents in the plurality of ranks by redistributing the first extents in the plurality of ranks, wherein the redistributing is performed in response to determining that an overhead for the redistributing does not exceed an expected increase in processing speed from the redistributing, and wherein the first extent of a logical volume stores a directory information of the logical volume.

6. The system of claim 5, wherein the redistributing further comprises:
moving a first extent of a first logical volume from a first rank to a second rank of the plurality or ranks, in response to determining that the second rank has a fewer number of first extents than the first rank.

7. The system of claim 5, the operations further comprising:
in response to a request to add a new logical volume to the plurality of extents, placing a first extent of the new logical volume in a rank of the plurality of ranks that has fewer first extents than other ranks of the plurality of ranks.

8. The system of claim 5, wherein a logical volume is a logical representation of physical volumes stored in one or more storage devices, wherein a rank is a logically contiguous storage space, and wherein an extent is a unit of storage.

9. A computer program product, the computer program product comprising a computer readable storage medium having computer readable program code embodied therewith, the computer readable program code configured to perform operations, the operations comprising:
storing a plurality of extents of a plurality of logical volumes in a plurality of ranks, wherein each logical volume of the plurality of logical volumes is comprised of a plurality of extents including a first extent;
determining that first extents stored in each rank of the plurality of ranks have become unbalanced in number in the plurality of ranks by determining that a number of first extents differs by more than a predetermined percentage between any two ranks of the plurality of ranks; and
in response to determining that first extents stored in each rank of the plurality of ranks have become unbalanced in number in the plurality of ranks, performing a balancing of the first extents in the plurality of ranks by redistributing the first extents in the plurality of ranks, wherein the redistributing is performed in response to determining that an overhead for the redistributing does not exceed an expected increase in processing speed from the redistributing, and wherein the first extent of a logical volume stores a directory information of the logical volume.

10. The computer program product of claim 9, wherein the redistributing further comprises:
moving a first extent of a first logical volume from a first rank to a second rank of the plurality or ranks, in response to determining that the second rank has a fewer number of first extents than the first rank.

11. The computer program product of claim 9, the operations further comprising:
in response to a request to add a new logical volume to the plurality of extents, placing a first extent of the new logical volume in a rank of the plurality of ranks that has fewer first extents than other ranks of the plurality of ranks.

12. The computer program product of claim 9, wherein a logical volume is a logical representation of physical volumes stored in one or more storage devices, wherein a rank is a logically contiguous storage space, and wherein an extent is a unit of storage.

13. A storage controller, comprising:
a cache;
a storage management application maintained in the storage controller, wherein the storage management application performs operations, the operations comprising:
storing a plurality of extents of a plurality of logical volumes in a plurality of ranks, wherein each logical volume of the plurality of logical volumes is comprised of a plurality of extents including a first extent;
determining that first extents stored in each rank of the plurality of ranks have become unbalanced in number in the plurality of ranks by determining that a number of first extents differs by more than a predetermined percentage between any two ranks of the plurality of ranks; and
in response to determining that first extents stored in each rank of the plurality of ranks have become unbalanced in number in the plurality of ranks, performing a balancing of the first extents in the plurality of ranks by redistributing the first extents in the plurality of ranks, wherein the redistributing is performed in response to determining that an overhead for the redistributing does not exceed an expected increase in processing speed from the redistributing, and wherein the first extent of a logical volume stores a directory information of the logical volume.

14. The storage controller of claim 13, wherein the redistributing further comprises:
moving a first extent of a first logical volume from a first rank to a second rank of the plurality or ranks, in response to determining that the second rank has a fewer number of first extents than the first rank.

15. The method of claim 1, wherein the plurality of ranks are Redundant Array of Independent Disks (RAID) ranks.

16. The method of claim 15, wherein data is written on the first extent of the logical volume prior to any data being written on other extents of the logical volume.

17. The system of claim 5, wherein the plurality of ranks are Redundant Array of Independent Disks (RAID) ranks.

18. The system of claim 17, wherein data is written on the first extent of the logical volume prior to any data being written on other extents of the logical volume.

19. The computer program product of claim 9, wherein the plurality of ranks are Redundant Array of Independent Disks (RAID) ranks.

20. The computer program product of claim 19, wherein data is written on the first extent of the logical volume prior to any data being written on other extents of the logical volume.

21. The storage controller of claim 13, wherein the plurality of ranks are Redundant Array of Independent Disks (RAID) ranks.

22. The storage controller of claim 21, wherein data is written on the first extent of the logical volume prior to any data being written on other extents of the logical volume.

23. The storage controller of claim 13, the operations further comprising:
   in response to a request to add a new logical volume to the plurality of extents, placing a first extent of the new logical volume in a rank of the plurality of ranks that has fewer first extents than other ranks of the plurality of ranks.

24. The storage controller of claim 13, wherein a logical volume is a logical representation of physical volumes stored in one or more storage devices, wherein a rank is a logically contiguous storage space, and wherein an extent is a unit of storage.

\* \* \* \* \*